United States Patent [19]

Sumiya et al.

[11] Patent Number: 4,727,772
[45] Date of Patent: Mar. 1, 1988

[54] MULTISTAGE AUTOMATIC SHIFT CONTROL APPARATUS

[75] Inventors: Koji Sumiya, Nishio; Yoshikazu Sakaguchi, Anjo; Takuji Taniguchi, Okazaki; Yutaka Taga, Aichi; Yoshio Shindo, Toyota, all of Japan

[73] Assignees: Aisin-Warner Kabushiki Kaisha; Toyota Jidosha Kabushiki Kaisha, both of Aichi, Japan

[21] Appl. No.: 846,041

[22] Filed: Mar. 31, 1986

[30] Foreign Application Priority Data

Jul. 31, 1985 [JP] Japan .................. 60-169189

[51] Int. Cl.⁴ .............................. B60K 41/02
[52] U.S. Cl. ...................... 74/867; 74/752 A
[58] Field of Search ............ 74/740, 752 A, 867, 74/868, 869, 866, 856, 859; 192/3.58

[56] References Cited

U.S. PATENT DOCUMENTS

| | | | |
|---|---|---|---|
| 2,923,175 | 2/1960 | Perkins | 74/740 |
| 3,501,979 | 3/1970 | Forster et al. | 74/869 |
| 3,752,011 | 8/1973 | Casey et al. | 74/866 |
| 3,752,015 | 8/1973 | Murakami | 74/869 |
| 3,842,693 | 10/1974 | Oberpichler | 74/868 |
| 3,956,947 | 5/1976 | Leising et al. | 74/866 |
| 4,021,712 | 5/1977 | Ishihara et al. | 74/866 |
| 4,155,277 | 5/1979 | Minami et al. | 74/866 |
| 4,274,307 | 6/1981 | Iwanaga et al. | 74/869 |
| 4,314,488 | 2/1982 | Lauven | 74/869 X |
| 4,324,153 | 4/1982 | Sugimoto et al. | 74/866 |
| 4,334,441 | 6/1982 | Iwanaga et al. | 74/869 |
| 4,367,528 | 1/1983 | Kawamoto et al. | 74/866 X |
| 4,393,467 | 7/1983 | Miki et al. | 74/866 X |
| 4,411,174 | 10/1983 | Yokoi et al. | 74/866 |
| 4,485,695 | 12/1984 | Kawamoto | 74/868 |
| 4,527,678 | 7/1985 | Pierce et al. | 74/866 |
| 4,532,829 | 8/1985 | Sugano | 74/869 |
| 4,576,062 | 3/1986 | Reppert et al. | 74/740 |

FOREIGN PATENT DOCUMENTS

| | | | |
|---|---|---|---|
| 123041 | 9/1980 | Japan | 74/869 |
| 37140 | 3/1982 | Japan . | |
| 183147 | 10/1984 | Japan . | |
| 231059 | 11/1985 | Japan | 74/866 |
| 237256 | 11/1985 | Japan | 74/866 |

Primary Examiner—Leslie Braun
Assistant Examiner—David Novais
Attorney, Agent, or Firm—Wenderoth, Lind & Ponack

[57] ABSTRACT

A rotational speed detecting device for detecting the rotational speed of a predetermined element of a shifting unit is provided for at least one of a main shifting unit and a sub-shifting unit. A control is provided for controlling a predetermined friction engaging element of at least one of the shifting units according to signals from the rotational speed detecting device, so that shifting operations of both the shifting units will be synchronized when both the units are shifted. Therefore, the output of speed of the transmission is not temporarily increased or decreased and thus, smooth shifting is obtained.

7 Claims, 15 Drawing Figures

FIG. 5

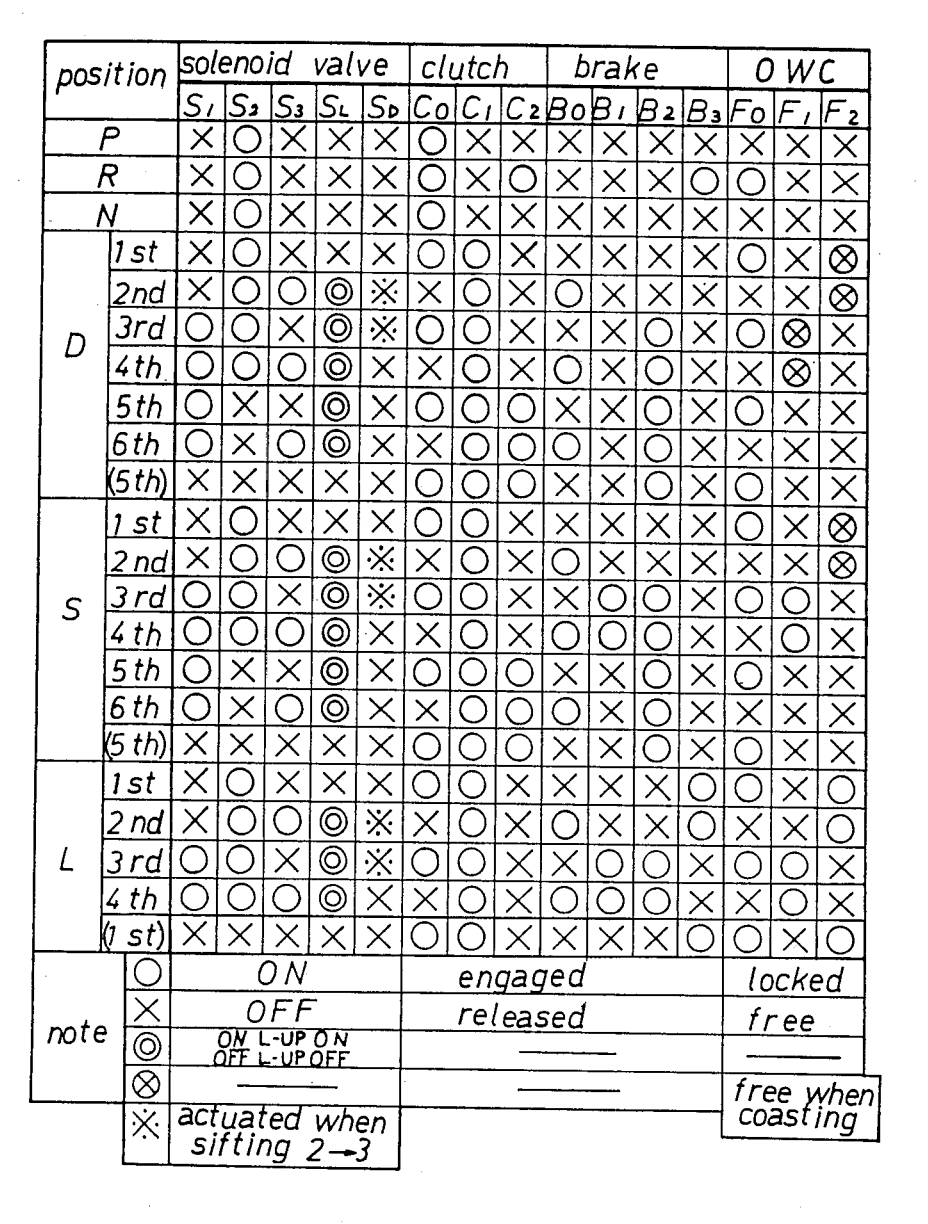

| position | | solenoid valve | | | | | clutch | | | brake | | | | OWC | | |
|---|---|---|---|---|---|---|---|---|---|---|---|---|---|---|---|---|
| | | $S_1$ | $S_2$ | $S_3$ | $S_L$ | $S_D$ | $C_0$ | $C_1$ | $C_2$ | $B_0$ | $B_1$ | $B_2$ | $B_3$ | $F_0$ | $F_1$ | $F_2$ |
| P | | × | ○ | × | × | × | ○ | × | × | × | × | × | × | × | × | × |
| R | | × | ○ | × | × | × | ○ | × | ○ | × | × | × | ○ | ○ | × | × |
| N | | × | ○ | × | × | × | ○ | × | × | × | × | × | × | × | × | × |
| D | 1st | × | ○ | × | × | × | ○ | ○ | × | × | × | × | × | ○ | × | ⊗ |
| D | 2nd | × | ○ | ○ | ◎ | ※ | ○ | ○ | × | ○ | × | × | × | × | × | ⊗ |
| D | 3rd | ○ | ○ | × | ◎ | ※ | ○ | ○ | × | × | × | ○ | × | ○ | ⊗ | × |
| D | 4th | ○ | ○ | ○ | ◎ | × | ○ | ○ | × | ○ | × | ○ | × | × | ⊗ | × |
| D | 5th | ○ | × | × | ◎ | × | × | ○ | ○ | × | × | × | × | ○ | × | × |
| D | 6th | ○ | × | ○ | ◎ | × | × | ○ | ○ | ○ | × | × | × | × | × | × |
| D | (5th) | × | × | × | × | × | ○ | ○ | ○ | × | × | ○ | × | ○ | × | × |
| S | 1st | × | ○ | × | × | × | ○ | ○ | × | × | × | × | × | ○ | × | ⊗ |
| S | 2nd | × | ○ | ○ | ◎ | ※ | ○ | ○ | × | ○ | × | × | × | × | × | ⊗ |
| S | 3rd | ○ | ○ | × | ◎ | ※ | ○ | ○ | × | × | ○ | ○ | × | ○ | ○ | × |
| S | 4th | ○ | ○ | ○ | ◎ | × | ○ | ○ | × | ○ | ○ | ○ | × | × | ○ | × |
| S | 5th | ○ | × | × | ◎ | × | ○ | ○ | ○ | × | × | × | × | ○ | × | × |
| S | 6th | ○ | × | ○ | ◎ | × | × | ○ | ○ | ○ | ○ | × | × | × | × | × |
| S | (5th) | × | × | × | × | × | ○ | ○ | ○ | × | ○ | × | × | ○ | × | × |
| L | 1st | × | ○ | × | × | × | ○ | ○ | × | × | × | × | ○ | ○ | × | × |
| L | 2nd | × | ○ | ○ | ◎ | ※ | × | ○ | × | ○ | × | × | ○ | × | × | ○ |
| L | 3rd | ○ | ○ | × | ◎ | ※ | ○ | ○ | × | × | ○ | ○ | × | ○ | ○ | × |
| L | 4th | ○ | ○ | ○ | ◎ | × | × | ○ | × | ○ | ○ | ○ | × | × | ○ | × |
| L | (1st) | × | × | × | × | × | ○ | ○ | × | × | × | × | ○ | ○ | × | ○ |

| note | | | |
|---|---|---|---|
| ○ | ON | engaged | locked |
| × | OFF | released | free |
| ◎ | ON L-UP ON / OFF L-UP OFF | — | — |
| ⊗ | | — | free when coasting |
| ※ | actuated when sifting 2→3 | | |

2nd

3rd

4th

5th

MULTISTAGE AUTOMATIC SHIFT CONTROL APPARATUS

BACKGROUND OF THE INVENTION

1. Field of the Invention

This invention relates to an automatic transmission installed in an automobile, and more particularly to a control apparatus of a multistage automatic transmission comprising a main shifting unit and a sub-shifting unit.

2. Description of the Related Art

Generally, an automatic transmission includes a torque converter and a planetary gear shifting mechanism. The gear shifting mechanism comprises an overdrive (O/D) planetary gear unit, a front planetary gear unit and a rear planetary gear unit. The gear shifting mechanism offers four forward stages and one rear stage by means of two solenoid valves and three shifting valves.

Also, as disclosed in a Japanese Laid-open Patent Application No. 57-37140, there has been proposed by the present applicant an automatic shift control apparatus for obtaining six forward stages of shifting, wherein three solenoid valves and three shifting valves are provided, an overdrive planetary gear unit functioning as a sub-shifting unit is used in combination with a main shifting unit comprising a front and a rear planetary gear unit.

By the way, the multistage automatic transmission comprising the sub-shifting unit and main shifting unit obtains 6 stages of shifting through a combination of two stages obtained from the overdrive and direct connection of the sub-shifting unit and first speed, second speed and third speed of the main shifting unit. At this time, there occurs a situation in which one of the shifting units is down-shifted while the other is up-shifted. For example, the sub-shifting unit is down-shifted from the overdrive state to the directly connecting state and simultaneously the main shifting unit is up-shifted from first speed to second speed, thus shifting from second speed to third speed in total. In the foregoing case, according to the conventional control apparatus, since no countermeasure is taken to complete both the shifting operations at the same time, there is a possibility that one of the shifting operations is effected first and then the other shifting operation is effected. For example, when the down-shift is effected first, the shifting unit is first reduced (to first speed) in speed extensively, and thereafter increased (third speed) in speed extensively. On the other hand, when the up-shift is effected first, the shifting unit is first increased (to fourth speed) in speed extensively and thereafter reduced in speed. Due to the foregoing, a blow-up and fall in engine speed occurs and so does a large shifting shock.

SUMMARY OF THE INVENTION

It is therefore an object of the present invention to provide a multistage automatic shift control apparatus, wherein shifting operations of a main shifting unit and a sub-shifting unit are synchronized by sensing the shifting state of one or both the shifting units, so that the aforementioned problems will be eliminated.

That is, the present invention comprises a rotating speed detecting means for detecting the rotational speed of a predetermined element of at least one of the sub-shifting unit and main shifting unit and a control means for controlling a predetermined friction engaging element of at least one of the aforementioned shifting units, so that the shifting operations of both the shifting units will be synchronized according to signals from the rotating speed detecting means.

Due to the above constitution of the present invention, the multistage shifting is effected by the combination of the respective shifting stages of the sub-shifting unit and the main shifting unit, and at the same time, the shifting operations of both the sub-shifting unit and the main shifting unit, particularly the down-shifting operation of the sub-shifting unit and the up-shifting operation of the main shifting unit are synchronized. Accordingly, no temporary decrease or increase of speed is made during the shifting operations. Thus, a smooth shifting operation can be obtained by preventing the blow-up and fall of the engine speed.

BRIEF DESCRIPTION OF THE DRAWINGS

FIG. 5 is an illustration showing the operating state of the respective devices in the respective positions;

DESCRIPTION OF THE PREFERRED EMBODIMENT

Figure 6:
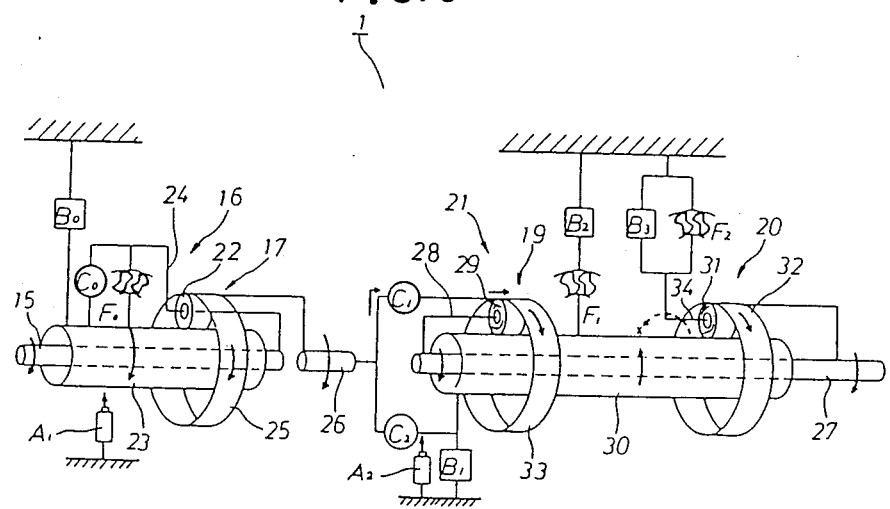
FIG. 6 through FIG. 12 are illustrations showing operations of the automatic transmission in different states.

One embodiment of the present invention comprises, as shown in FIG. 6 for example, a rotary sensor $A_2$ (and $A_1$) associated with at least one of a sub-shifting unit 16 and a main shifting unit 21 and adapted to detect the rotational speed of a predetermined element such as a sun gear 30 (and 23) for example. A predetermined friction engaging element $B_o$ of at least one of the shifting units is controlled according to signals from the rotary sensor $A_2$ (and $A_1$), so that shifting operations of both the shifting units 16 and 21 will be synchronized.

Figure 1:
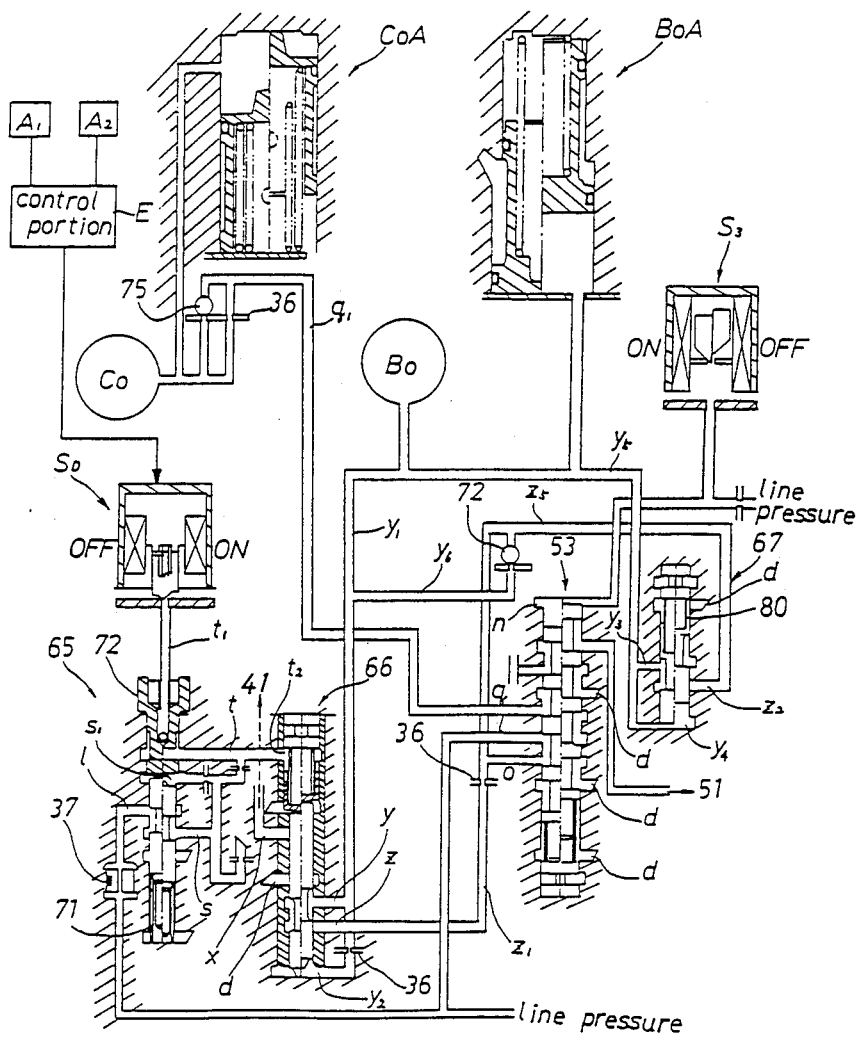
FIG. 1 is an illustration showing a main part of a hydraulic control mechanism according to the present invention.

More specifically, as shown in FIG. 1, a $B_o$ release control valve 66 for controlling a release pressure of an O/D brake $B_o$ is provided. The valve 66 is controlled according to signals from a control portion E based on the rotary sensor $A_2$ (and $A_1$) through a solenoid valve $S_D$, so that the up-shifting (first speed to second speed, for example) operation due to engagement of a brake $B_2$ of the main shifting unit 21 will be effected in synchronism with the down-shifting (O/D to direct connection) operation of the sub-shifting unit due to release of the O/D brake $B_o$.

At this time, the solenoid valve $S_D$ may be duty controlled by obtaining signals from both the rotary sensor $A_2$ for detecting the rotational speed of the sun gear 30 at the main shifting unit 21 and the rotary sensor $A_1$ for detecting the rotational speed of the sun gear 23 at the sub-shifting unit 16. Alternatively, the solenoid valve $S_D$ may be on-off controlled by obtaining only signals from the rotary sensor $A_2$ at the main shifting unit 21 side.

With the above constitution, for example, when shifting from second speed to third speed is performed by the transmission 1 as a whole, the main shifting unit 21 is up-shifted from first speed to second speed due to engagement of the brake $B_2$, while the sub-shifting unit 16 is down-shifted from O/D to direct connection due to release of the brake $B_o$ and engagement of the clutch $C_D$. At this time, the solenoid valve $S_D$ fed with a modulator pressure at the $S_D$ modulator valve 65 is duty controlled or on controlled by signals from the control portion E to control the $B_o$ release control valve 66 to control a releasing operation of the O/D brake $B_o$. Due to the foregoing, when the brake $B_2$ of the main shifting unit 21 is engaged, the brake $B_o$ of the sub-shifting unit 16 is synchronously released.

A more specific embodiment of the present invention will be described hereunder with reference to the accompanying drawings.

Figure 2:
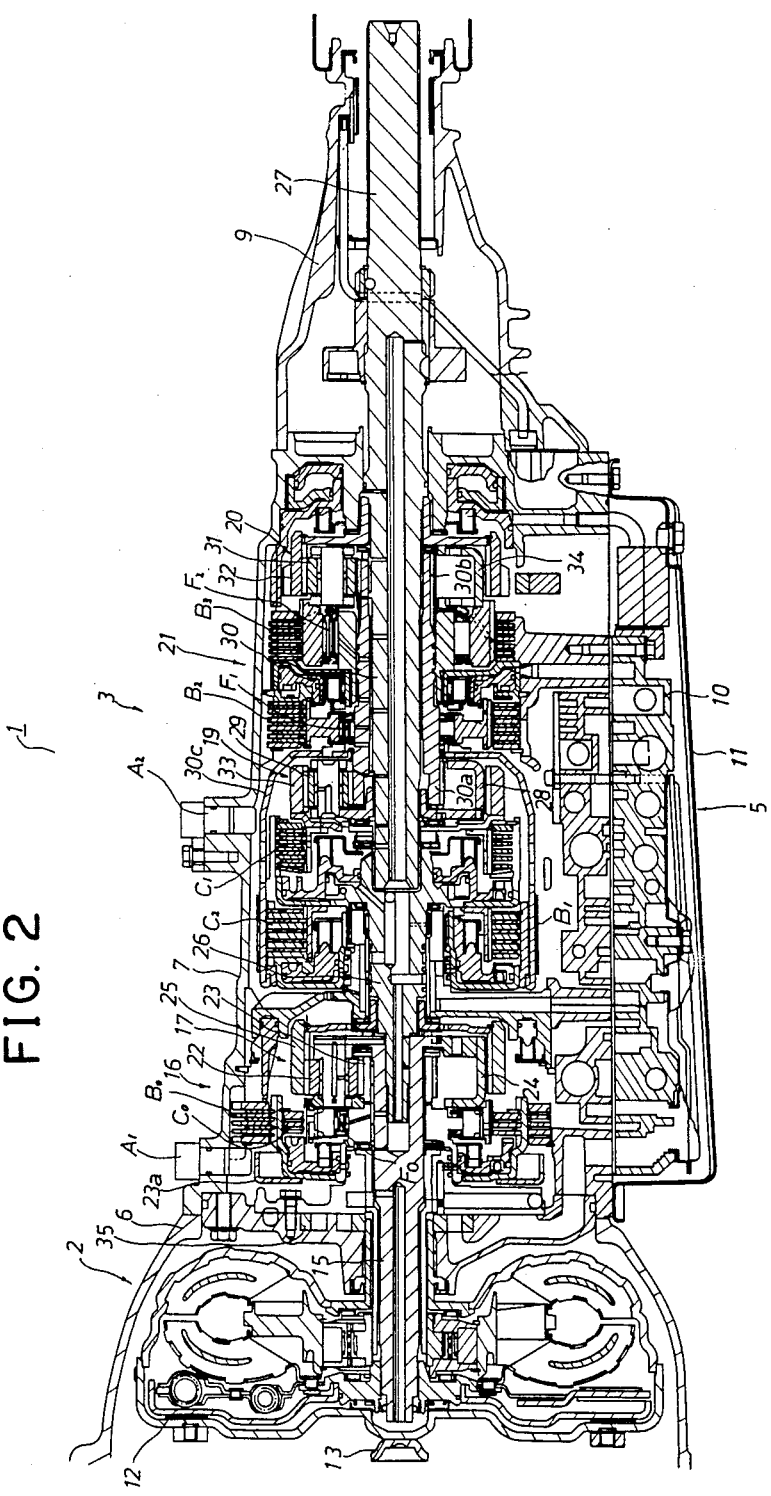
FIG. 2 is an overall sectional view showing an automatic transmission incorporating the present invention.

The multistage transmission 1 includes, as shown in FIG. 2, a torque converter 2, a planetary gear shifting mechanism 3 and a hydraulic control mechanism 5 which are contained in a converter housing 6, a transmission case 7 and an extension housing 9, a valve body 10 and an oil pan 11, respectively. The torque converter 2 includes a lock up clutch 12 and transmits rotation of the input member 13 through an oil flow of the torque converter 2 or directly to an input shift 15 of the shifting gear mechanism 3 by the lock up clutch 12. The gear shifting mechanism 3 comprises a sub-shifting unit 16 comprising an overdrive (O/D) planetary gear unit 17 and a main shifting unit 21 comprising a front planetary gear unit 19 and a rear planetary gear unit 20. The O/D planetary gear unit 17 comprises a carrier 24 directly connected to the input shaft 15 and supporting the planetary gear 22, a sun gear 23 mounted on the input shaft 15, and a ring gear 25 connected to the input shaft 26 of the main shifting unit 21. Interposed between the carrier 24 and the sun gear 23 are the O/D direct clutch $C_o$ and one-way clutch $F_o$. Interposed between the sun gear 23 and the case 7 is the O/D brake $B_o$. The front planetary gear unit 19 comprises a carrier 28 directly connected to the output shaft 27 and supporting the planetary gear 29, a sun gear 30a mounted on the output shaft 27 and integrally formed with the sun gear 30b of the rear planetary gear unit 20, and a ring gear 33 connected to the input shaft 26 through a forward clutch $C_1$. A direct clutch $C_2$ is interposed between the input shaft 26 and the sun gear 30. A first brake $B_1$ is interposed between the sun gear 30 and the case 7. Further, a brake $B_2$ is interposed between the sun gear 30 and the case 7 through a one-way clutch $F_1$. The rear planetary gear unit 20 comprises a carrier 34 supporting the planetary gear 31, sun gear 30b, and a ring gear 32 directly connected to the output shaft 27. A brake $B_3$ and a one-way clutch $F_2$ are interposed in parallel between the carrier 34 and case 7. In FIG. 2, numeral 35 denotes an oil pump.

The case 7 of the O/D planetary gear unit 17 portion is provided with a rotary sensor $A_1$ comprising an optoelectric sensor or a magnetic sensor, etc. A flange piece 23a connected to the sun gear 23 is formed with cut-outs or holes at equal spaces. Accordingly, the rotary sensor $A_1$ detects rotational speed of the sun gear 23, i.e. the shifting state of the sub-shifting unit 16. The case 7 of the front planetary gear unit 19 portion is also provided with a rotary sensor $A_2$. Similarly, a clutch connecting piece 30c extending from the sun gear 30 is formed with cut-outs or holes at equal spaces. Accordingly, the rotary sensor $A_2$ detects the rotational speed of the sun gear 30, i.e. the shifting state of the main shifting unit 21.

Figure 3:
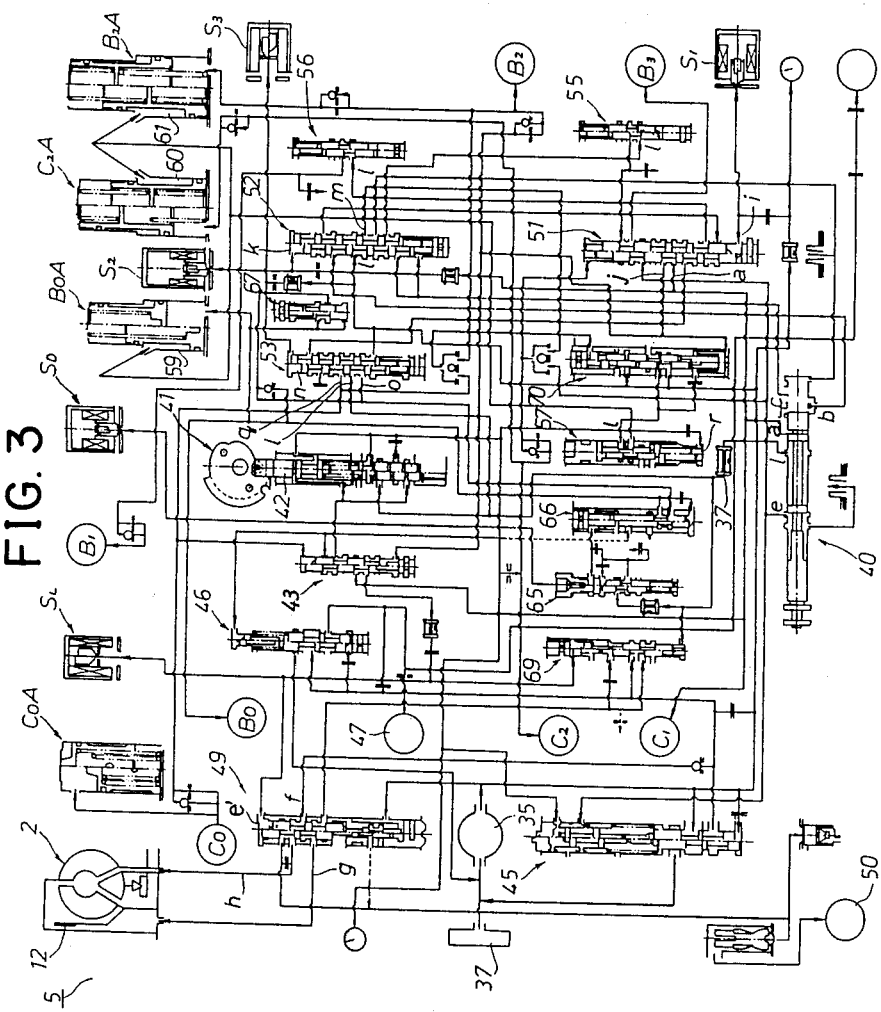
FIG. 3 is an overall illustration showing a hydraulic control mechanism thereof.
Figure 4:
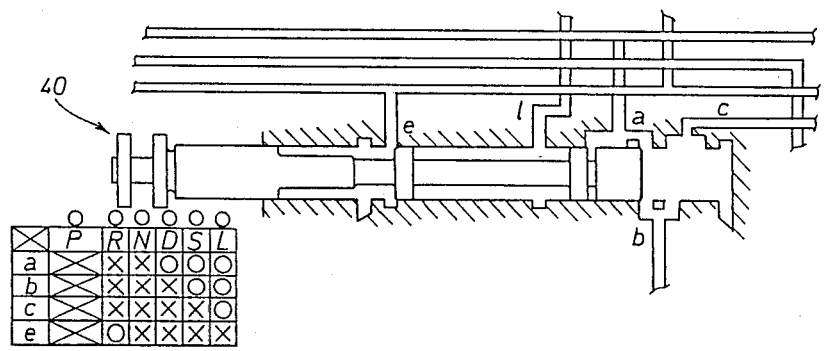
FIG. 4 is an illustration showing a manual valve thereof.

On the other hand, the hydraulic shift controlling mechanism 5 comprises, as shown in FIG. 3, a number of valves, an accumulator, an orifice 36, a filter 37, etc. The respective valves will be described hereinafter. A manual valve 40 is shifted to the respective ranges of P, R, N, D, S and L by a shift lever, and respective oil paths a, b, c, and e are shifted respectively, as shown in FIG. 4. The oil path 1 is fed with a line pressure. A throttle valve 41 has a down shift plug 42. A cam is rotated according to stepping on operation of an accelerator pedal to obtain a throttle pressure corresponding to the engine output. A cut-back valve 43 generates a cut-back pressure except when transmission is in first speed, reverse, and P, N range. The cut-back pressure is subjected to the throttle valve 41 to decrease the throttle pressure. A primary regulator valve 45 is pressure controlled with the throttle pressure and generates a line pressure corresponding to a load. That is, when the load is high, the line pressure is increased to obtain an operation pressure of the clutches C . . . and brakes B . . . . On the other hand, when the load is low, the line pressure is controlled to be lowered. A secondary regulator valve 46 is pressure controlled with hydraulic pressure from the primary regulator valve 45 and controls the pressure of converter oil and lubricating oil to be fed to the converter 2 and respective lubricating parts 47. A lock-up relay valve 49 is controlled by a solenoid valve $S_L$ and shifts the oil flow communicating with the lock-up clutch 12 and an oil cooler 50. That is, when the solenoid valve $S_L$ is turned on, an upper end oil chamber e' is subjected to the line pressure. Due to the foregoing, an oil path f in which converter pressure oil pressure controlled by the secondary regulator valve 46 is switched from a lock-up clutch-off oil path g to an on-oil path h and opens an off-oil path g to a drain circuit. A first shift valve 51 is adapted to shift between first speed and second speed (first speed and third speed of the transmission 1 as a whole) of the main shifting unit 21 and is actuated by the solenoid valve $S_1$. That is, when the solenoid valve $S_1$ is turned off, an oil chamber i is subjected to the line pressure to block the line oil pressure path a at D range, S range and L range of the manual valve 40. On the other hand, when the solenoid valve $S_1$ is turned on, the oil path a communicates with an oil path j to feed the line pressure to the brake $B_2$ and $B_2$ accumulator $B_2A$. A second shift valve 52 is adapted to shift between second speed and third speed (third speed and fifth speed of the transmission as a whole) of the main shifting unit 21 and is actuated by the solenoid valve $S_2$. That is, when the solenoid valve $S_2$ is turned off, an oil chamber k is subjected to the line pressure to cause a line pressure oil path l to communicate with an oil path m so that the line pressure is fed to a direct clutch $C_2$ and $C_2$ accumulator $C_2A$. On the other hand, when the solenoid valve $S_2$ is turned on, the line pressure oil path l is blocked. A third shift valve 53 is adapted to shift the sub-shifting unit 16 and is actuated by the solenoid valve $S_3$. That is, when the solenoid valve $S_3$ is turned on, an oil chamber n is subjected to the line pressure to cause the line pressure oil path l to communicate with an oil path o, so that the line pressure is fed to the O/D brake $B_o$ and $B_o$ accumulator $B_oA$ through a $B_o$ release control valve 65 as will be described later. On the other hand, when the solenoid valve $S_3$ is turned off, the line pressure oil path 1 communicates with an oil path q to feed the line pressure to an O/D direct clutch $C_o$ and $C_o$ accumulator $C_o A$. A first coast modulator valve 55 is adapted to control pressure of the line pressure of the oil path 1 fed from a port c through the second shift valve 52 to the coast modulator pressure at L range of the manual valve 40 and to feed the coast modulator pressure to first and Rev brake $B_3$ through the first shift valve 51. A second coast modulator valve 56 is adapted to control pressure of the line pressure of the oil path 1 fed from a port b through the second shift valve 52 and first shift valve 51 to the coast modulator pressure at S range of the manual valve 40 and to feed the coast modulator pressure to the second brake $B_1$. The first accumulator coast valve 57 feeds the throttle pressure to an oil chamber r, so that the line pressure 1 fed through a second accumulator control valve 70; as will be described later, is pressure controlled to the accumulator control pressure and the control pressure is fed to respective back pressure chambers 59, 60 and 61 of the $B_o$ accumulator $B_o A$, $C_2$ accumulator $C_2 A$ and $B_2$ accumulator $B_2 A$.

Furthermore, in addition to the above-mentioned respective hydraulic devices, the present hydraulic shift controlling mechanism 5 is provided with a $S_D$ modulator valve 65, a $B_o$ release control valve 66, a $B_o$ sequence valve 67, a lock-up control valve 69 and a second accumulator control valve 70.

Regarding the $S_D$ modulator valve 65 is shown in detail in FIG. 1, the line pressure is fed from the line pressure port 1 through the oil filter 37, and to the upper end oil chamber $S_1$ through the oil path s. The line pressure is pressure controlled to a predetermined pressure (4 kg/cm$^2$, for example) due to the balancing of the feed back pressure acting in the oil chamber $s_1$ and a spring 71. In addition, the controlled solenoid modulator pressure is fed to an oil path t. The oil path t communicates with the solenoid valve $S_D$ through a plug 72 and an oil path $t_1$ and further to the $B_o$ release control valve 66. The pressure as controlled due to on-off control of the solenoid valve $S_D$ or duty control is fed to an oil chamber $t_2$ to control the control valve 65. Although the solenoid valve $S_D$ is controlled by signals from the control portion E based on the rotary sensors $A_1$ and $A_2$, when the valve $S_D$ is on-off controlled, the throttle pressure is fed to an oil path x to set a brake release pressure corresponding to changes of loads. A port y of the $B_o$ release control valve 66 communicates with the O/D brake $B_o$ and $B_o$ accumulator $B_o A$ through an oil path $y_1$ and further with a lower end oil chamber $y_2$ which receives feed back pressure through the orifice 36. The brake $B_o$ and the accumulator $B_o A$ also communicate with a port $y_3$ of the sequence valve 67 through a by-pass $y_5$ and further with a lower end oil chamber $y_4$ of the valve 67 which receives feed back pressure. Furthermore, the brake $B_o$ and accumulator $B_o A$ communicate with a port o of the third shift valve 53 from a port z of the control valve 66 through an oil part $z_1$ and the orifice 36. The port o communicates with a port $z_2$ of the $B_o$ sequence valve 67 through a by-pass $z_5$. An oil path $y_6$ branched off from the oil path $y_1$ communicates with the by-pass $z_5$ through a check valve 72. On the other hand, the third shift valve 53 communicates at its upper chamber n with the solenoid valve $S_3$ and the line pressure. In addition, a port q communicates with the O/D direct clutch $C_o$ and $C_o$ accumulator $C_o A$ through an oil path $q_1$ and the orifice 36. The orifice 36 of the oil path $q_1$ is provided in parallel with respect to a check valve permitting a discharge of oil from the clutch $C_o$. In the figure, d denotes a drain port.

The lock-up control valve 69 operates when the sub-shifting unit 16 is in the O/D state even when the main shifting unit 21 is first speed, i.e. when the transmission as a whole is higher than second speed, and when the conventional main unit 21 is in higher than second speed, to effect the lock up. The second accumulator control valve 70 is adapted to decrease the pressure to be fed to the back pressure chambers 59, 60 and 61 of the accumulator $B_o A$, $C_2 A$ and $B_2 A$ to correct the braking capacity since the brake capacity of the main shifting unit is excessive when the main shifting unit 21 is up shifted with the sub-shifting unit 16 in the O/D state as compared to when the sub-shifting unit 16 is directly connected.

Next, the operation of the present embodiment will be described.

The respective solenoid valves $S_1$, $S_2$, $S_3$, $S_L$ and $S_D$, the respective clutches $C_o$, $C_1$, and $C_2$, the respective brakes $B_o$, $B_1$ and $B_3$, and the respective one-way clutches $F_o$, $F_1$ and $F_2$ of the multistage automatic transmission 1 according to the present embodiment are controlled as shown in an operation table of FIG. 5 at the shifting stages in the respective positions P, R, N, D, S and L.

That is, when in first speed at D range or S range, as shown in FIG. 6, the O/D direct clutch $C_o$, one-way clutches $F_o$ and $F_2$ and forward clutch $C_1$ are engaged, and the remaining frictional engaging elements are held in the released state. Accordingly, the sub-shifting unit 16 is integrated with the planetary gear unit 17 through the clutch $C_o$ and one-way clutch $F_o$ and is held in the directly connected state, wherein rotation of the input shaft 15 is transmitted to the input shaft 26 of the main shifting unit 21 as is. In the main shifting unit 21, rotation of the main shaft 26 is transmitted to the ring gear 33 of the front planetary gear unit 19 through the clutch $C_1$, and further to the carrier 28 and the output shaft 27 integrally formed therewith. At the same time, a leftward rotating force is applied to the carrier 34 of the rear planetary gear unit 20 through the sun gear 30. However, rotation of the carrier 34 is prevented by the one-way clutch $F_2$, and the planetary gear 31 rotates about its own axis to transmit the power to the ring gear 32 integrally formed with the output shaft 27. That is, the main shifting unit 21 in the first speed state accompanied with the sub-shifting unit 16 in the directly connected state render a first speed state of the transmission as a whole. At this time, the torque output by the main shifting unit 21 is transmitted through two routes; one to the output shaft 27 through the front planetary gear unit 19 and the other to the output shaft 27 through the rear planetary gear unit 20. Therefore, the load acting on the respective gears is dispersed.

Figure 7:
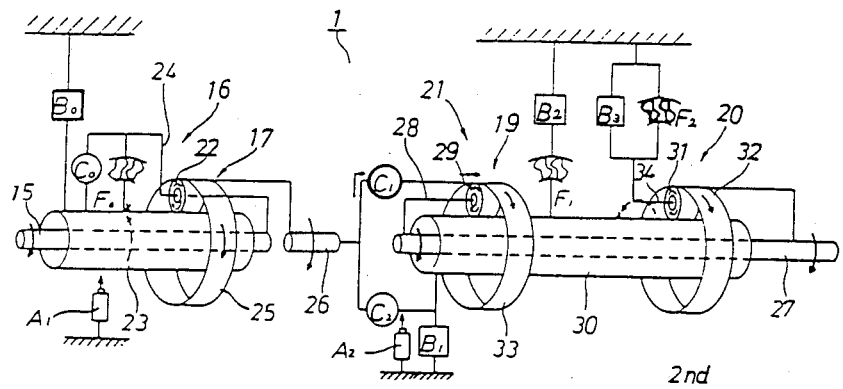

When in second speed at D range and S range, as shown in FIG. 7, the O/D brake $B_o$, one-way clutch $F_2$ and forward clutch $C_1$ are engaged and the remaining frictional engaging elements are in the released state. Accordingly, the sub-shifting unit 16 is locked to the sun gear 23 by the brake $B_o$, and the planetary gear 22 rotates about it own axis while the carrier 24 is being rotated to transmit the torque to ring gear 25 and the speed-increasing rotation (O/D) to the input shaft 26 of the main shifting unit 21. The main shifting unit 21 is the same as in the aforementioned first speed state. Accordingly, the first speed of the main shifting unit 21 accompanied with the speed-increasing rotation (O/D) of the sub-shifting unit 16 renders a second speed state of the transmission as a whole.

At this time, as shown in FIG. 1, the solenoid valve $S_3$ is turned on and the third shift valve 53 is fed at its upper oil chamber n with the line pressure is shifted to one position shown in the left half of the figure. Then, the pressurized oil within the clutch $C_o$ and $C_o$ accumulator $C_oA$ is discharged to the drain port d from the port q to release the clutch $C_o$. At the same time, the line pressure port l communicates with the port o. The line pressure from the port o is fed directly to the O/D brake $B_o$ through the by-pass $z_5$, ports $z_2$ and $y_3$ of the sequence valve 67 and by-pass $y_5$ upto the initial operating pressure of the $B_o$ piston. When the operating pressure exceeds the $B_o$ piston initial operating pressure, the valve 67 is shifted to the right half position due to the feed back pressure at the oil chamber $y_4$. Thereafter, the line pressure from the port o is fed to the port z of the $B_o$ release control valve 66 through the orifice 36 and oil path $z_1$. In the foregoing state, the control valve 66 is located in the left half position, and the port z communicates with the port y. Further, the line pressure is fed to the brake $B_o$ and $B_o$ accumulator $B_oA$ through the oil path $y_1$ to engage the brake $B_o$.

Figure 8:
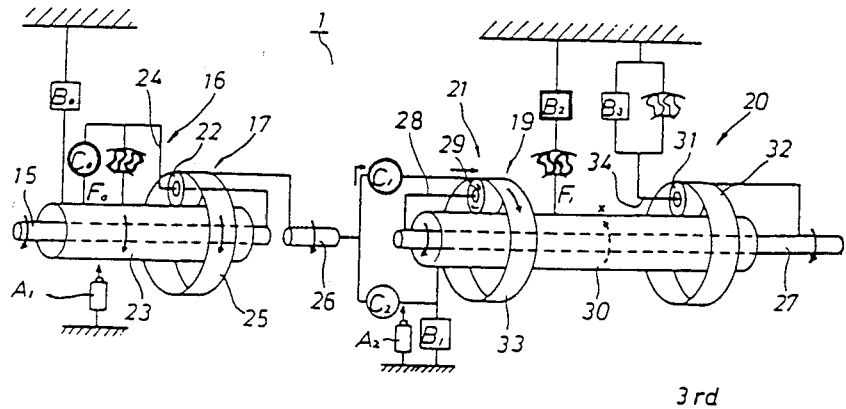

When in third speed at D range, as shown in FIG. 8, the O/D clutch $C_o$, one-way clutch $F_o$, forward clutch $C_1$, one-way clutch $F_1$ and brake $B_2$ are engaged and the remaining frictional engaging elements are held in the released state. Accordingly, the sub-shifting unit 16 is in the directly connected state as mentioned before, and rotation of the input shaft 15 is transmitted to the input shaft 26 of the main shifting unit 21 as is. Although the main shifting unit 21 has the rotation of the input shaft 26 transmitted thereto at the ring gear 33 of the front gear unit 19 through clutch $C_1$ which renders a leftward rotating force to the sun gear 30 through the planetary gear unit 29, the sun gear 30 is prevented from being rotated in that direction by the one-way clutch $F_1$ due to engagement of the brake $B_2$. Accordingly, the planetary gear 23 causes the carrier 28 to rotate while rotating about its own axis, and the second speed rotation is transmitted to the output shaft 27 through only the front gear unit 19. Due to the foregoing, the directly connected state of the sub-shifting unit 16 accompanied with the second speed state of the main shifting unit 21 renders a third speed of the transmission 1 as a whole.

Figure 13:
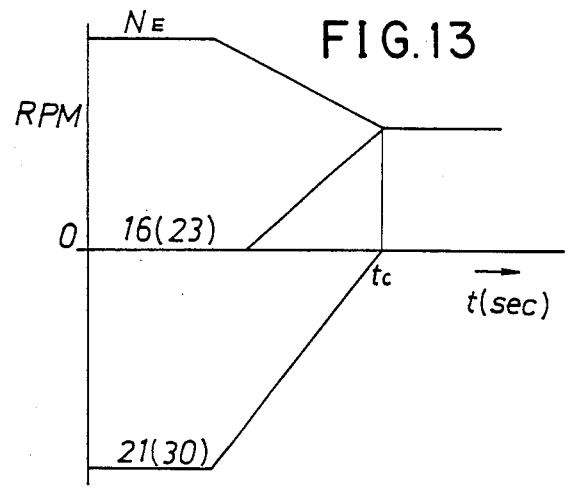
FIG. 13 is an illustration showing shifting operations of a sub-shifting unit and a main shifting unit.

At this time, the solenoid valve $S_1$ is turned on to shift the first shift valve 51 to the left half position shown in FIG. 3 to cause the line pressure oil path a to communicate with the port j, so that the line pressure is fed to the brake $B_2$ and accumulator $B_2$ A. The shifting state of the main shifting unit 21, i.e. change in rotation of the sun gear 30, due to the foregoing is sensed by the rotary sensor $A_2$, and the $B_o$ release controlling solenoid valve $S_D$ is duty controlled (or on controlled) by receiving electric signals from the control portion E due to start of the change in rotation, so that the modulator pressure of the oil path t is reduced. That is, although the $S_D$ modulator valve 65 feeds the line pressure of the line port l to the oil path t after controlling the pressure by means of the spring 71 and the feed back pressure at the upper oil chamber $s_1$, the modulator pressure is reduced due to the duty control (or on control) of the solenoid valve $S_D$ and the pressure of the upper oil chamber $t_2$ of the $B_o$ release control valve 66 communicating with the oil path t is also reduced. Accordingly, the control valve 66 is brought to the right half position of FIG. 1 while receiving the feed back pressure at the lower oil chamber $y_2$ thereof from the brake $B_o$, and the oil pressure from the brake $B_o$ and accumulator $B_oA$ is discharged to the drain port d through the oil path $y_1$ and port y. Due to the foregoing, the speed increasing state of the sun gear 30 of the main shifting unit, caused by engagement of the brake $B_2$, is sensed by the rotary sensor $A_2$. At the same time, the speed reducing state of the sub-shifting unit, caused by the release of the brake $B_o$, is sensed by the rotary sensor $A_1$. The solenoid valve $S_D$ is duty controlled by signals from the control portion E based on signal from the rotary sensors $A_1$ and $A_2$ to control the release pressure of the O/D brake $B_o$ and the the releasing operation of the O/D brake $B_o$ is concurrent with the engaging operation of the brake $B_2$. That is, as shown in FIG. 13, when rotation of the sun gear 30 in the main shifting unit 21 is reduced in speed upon engagement of the brake $B_2$, while the speed reducing state is sensed by the rotary sensor $A_2$ and at the same time the speed increasing state of the sun gear 23 in the sub-shifting unit 16 is sensed by the rotary sensor $A_1$, the solenoid valve $S_D$ is duty controlled to cause the O/D brake $B_o$ to effect a releasing operation, and to cause the sub-shifting brake $B_o$ to be completely released at the time ($t_c$) when rotation of the sun gear 30 is stopped due to full engagement of the main shifting brake $B_2$, so that shifting of both the shifting units 16 and 21 is concurrently effected. At this time, the completion of the shifting of the main shifting unit 21, i.e., the stopping of rotation of the sun gear 30, is sensed by the rotary sensor $A_2$, and the solenoid valve $S_3$ is turned off by electric signals from the control portion E to shift the third shift valve 53 to the right half position shown in FIG. 1. Then, the line pressure port l communicates with the port q, the line pressure is fed to the clutch $C_o$ and $C_o$ accumulator $C_oA$ to engage the clutch $C_o$, and the port o communicates with the drain port d, so that oil pressure of the O/D brake $B_o$ will be completely drained from the drain port d through the oil path $y_6$, check valve 72, oil path $z_5$ and port o to complete the shifting of the sub-shifting unit 16. In this way, the main shifting unit 21 and the sub-shifting unit 16 are operated in synchronism to obtain smooth shifting.

At this time, if the solenoid valve $S_D$ operates poorly and the $B_o$ release control valve 66 is stuck in the left half position shown in FIG. 1, the port y not communicating with the drain port d, the oil pressure within the brake $B_o$ is fed to the oil path $z_1$ through the ports y and z, and also to the oil path $z_5$ from the check valve 72 which is released when drained, and then discharged to the drain port d from the port o in the third shift valve 53 which is located in the right half position shown in FIG. 3, when the solenoid valve $S_3$ is turned off. Accordingly, even if the valve is operated poorly, safety is assured since the line pressure will be never fed to both the O/D brake $B_o$ and clutch $C_o$ to lock the O/D planetary gear unit 17.

Figure 9:
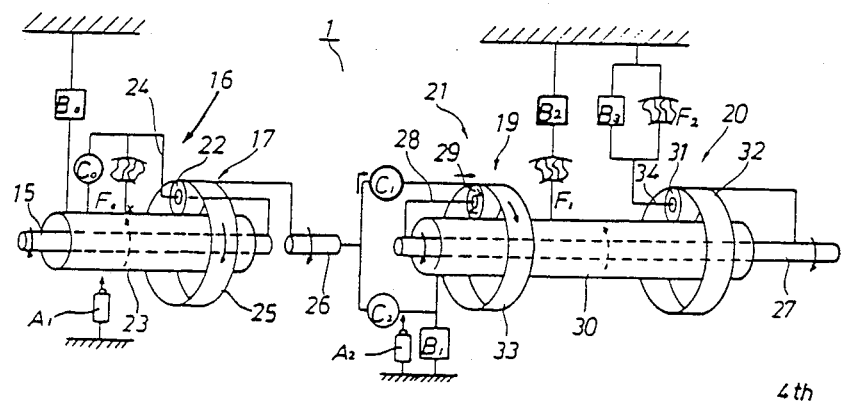

When in fourth speed at D range, as shown in FIG. 9, the O/D brake $B_o$, forward clutch $C_1$, brake $B_2$ and one-way clutch $F_1$ are engaged, and the remaining functional engaging elements are held in the released state. Accordingly, the sub-shifting unit 16 is held in the speed increasing (O/D) state as mentioned before and the main shifting unit 21 is held in the second speed state, thus enabling a fourth speed of the transmission 1 as a whole to be obtained.

Figure 10:
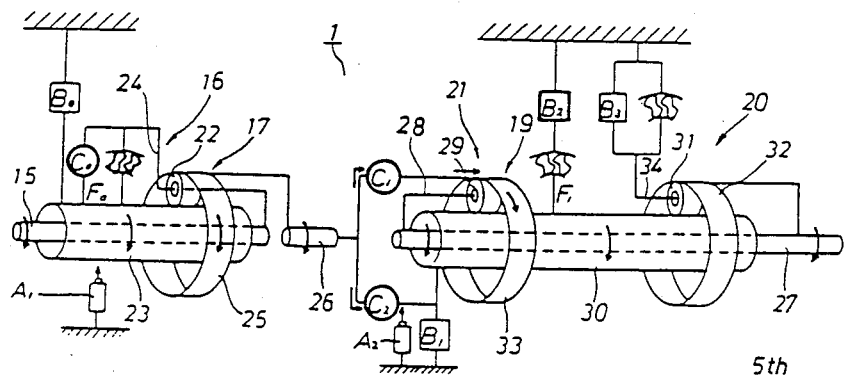

When in fifth speed at D range, as shown in FIG. 10, the O/D clutch $C_o$, one-way clutch $F_o$, forward clutch $C_1$, direct clutch $C_2$ and brake $B_2$ are engaged and the remaining frictional engaging elements are held in the released state. Accordingly, the sub-shifting unit 16 is held in the directly connected state as mentioned before. In the main shifting unit 21, the front planetary gear unit 19 is integrally formed due to engagement of the clutches $C_1$ and $C_2$, and rotation of the input shaft 26 is transmitted to the output shaft 27 as is. Due to the foregoing, the direct connection of the sub-shifting unit 16 accompanied with the third speed (direct connection) of the main shifting unit 21 enable a fifth speed of the transmission 1 as a whole to be obtained, wherein the input shaft 15 and output shaft 12 are integrally rotated.

At this time, as when shifting from second speed to third speed as mentioned before, while sensing the shifting state of the main shifting unit 21, i.e., the rotational speed of the sun gear 30, by the rotary sensor $A_2$, the $B_o$ release control valve 66 may be controlled by the solenoid valve $S_D$ according to signals from the control portion E based on the sensor $A_2$ to control the releasing state of the O/D brake $B_o$, and according to signals from both the rotary sensors $A_1$ and $A_2$, the solenoid valve $S_D$ may be controlled in such a manner so as to shift the sub-shifting unit 16 in synchronism with the main shifting unit 21 to control the pressure oil in the brake $B_o$ and then, the solenoid valve $S_D$ may be turned off to complete the shifting to obtain a smooth shifting.

Figure 11:
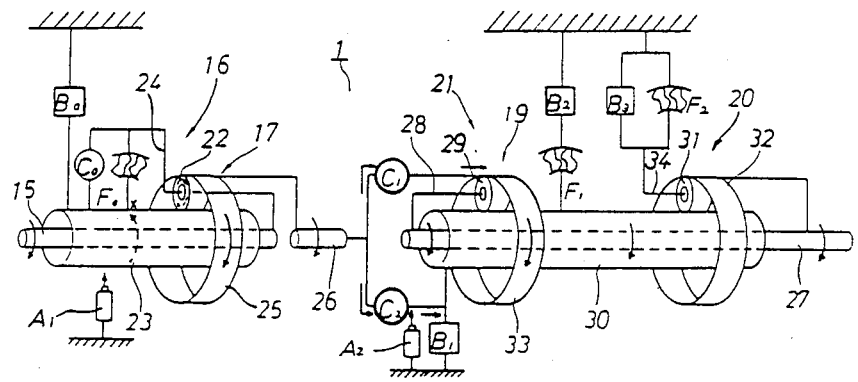

When in sixth speed at D range, as shown in FIG. 11, the O/D brake $B_o$, forward clutch $C_1$, direct clutch $C_2$ and brake $B_2$ are engaged, and the remaining frictional engaging elements are held in the released state. Accordingly, the sub-shifting unit 16 is held in the speed increasing (O/D) state as mentioned before and the main shifting unit 21 is held in the third speed state also as mentioned before. Both the shifting units 16 and 21 enable a sixth speed of the transmission 1 as a whole to be obtained.

Figure 12:
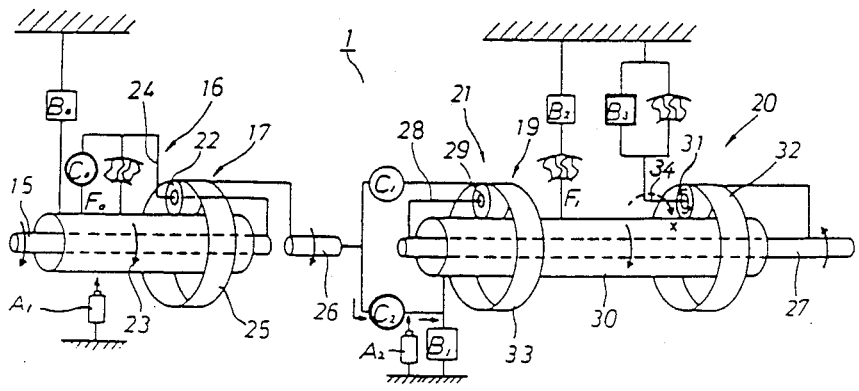

When in R range, as shown in FIG. 12, the O/D clutch $C_o$, one-way clutch $F_{oo}$, direct clutch $C_2$ and brake $B_3$ are engaged, and the remaining frictional engaging elements are held in the released state. Accordingly, the sub-shifting unit 16 is held in the directly connected state, while the main shifting unit 21 is held in a state such that rotation of the input shaft 26 is directly transmitted to the sun gear 30 by the clutch $C_2$ and since rotation of the carrier 34 of the rear planetary gear unit 20 is locked by the brake $B_3$, the rotation of the sun gear 32 is transmitted as a reverse rotation through rotation of the planetary gear 31 about its own axis to cause the output shaft 27 to be rotated reversely.

When in third speed and fourth speed at S range or L range, the coast brake $B_1$ is engaged in the aforementioned third speed and fourth speed (see FIG. 8 and FIG. 9). Accordingly, rotation of the sun gear 30 is prevented in both directions, thus enabling an engine brake to be effected. At this time, in order to shift from second speed to third speed, as in the case of D range, the solenoid valve $S_D$ is controlled to shift the sub-shifting unit 16 and main shifting unit 21 simultaneously.

When in first speed and second speed at L range, the brake $B_3$ is engaged in first speed and second speed (see FIG. 6 and FIG. 7). Accordingly, rotation of the carrier 34 of the rear planetary gear unit is prevented in both directions, thus enabling an engine brake to be effected.

Figure 14:
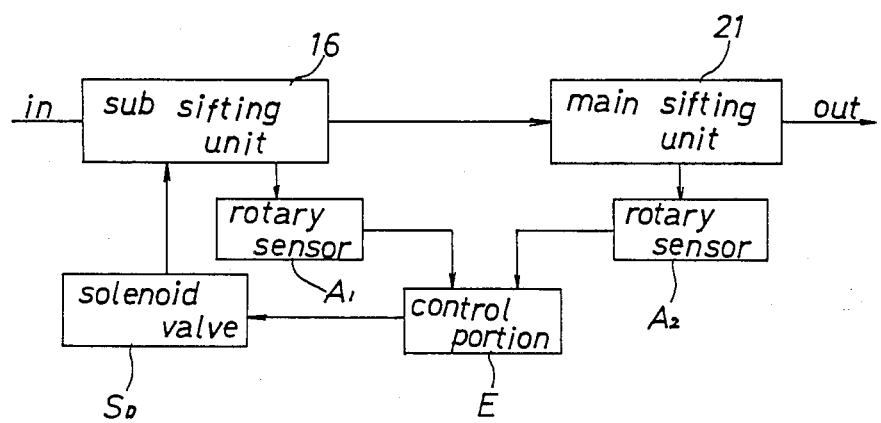
FIG. 14 is a block diagram showing one embodiment of the present invention.
Figure 15:
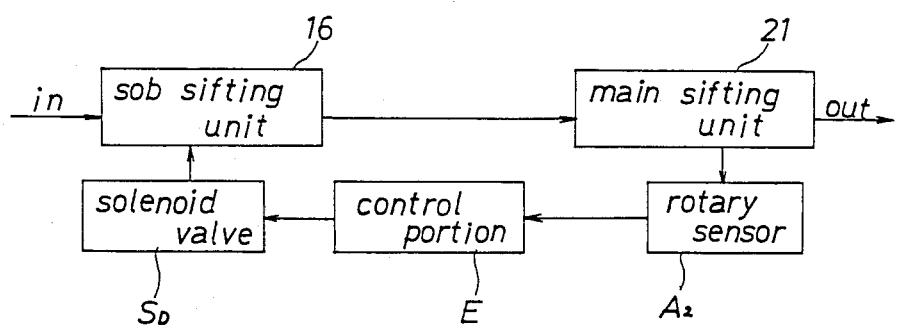
FIG. 15 is a block diagram showing another embodiment thereof.

In the above-mentioned embodiment, as shown in FIG. 14, the rotary sensors $A_1$ and $A_2$ are provided for both the sub-shifting unit 16 and main shifting unit 21 respectively and as a result of the sensing of rotation of both the units, the solenoid valve $S_D$ is duty controlled to coincide with the shifting time. Alternatively, as shown in FIG. 15, only the rotary sensor $A_2$ may be provided (for the main shifting unit 21) and the solenoid valve $S_D$ may be on-off controlled according to rotation of the main shifting unit 21.

Further, in the above mentioned embodiment, there has been described a rear wheel drive longitudinal automatic transmission, wherein the sub-shifting unit 16 is disposed at the front stage and the main shifting unit is disposed at the rear stage. However, the present invention may of course be applied to a front wheel drive transverse automatic transmission, wherein the main shifting unit is disposed at the front stage and the sub-shifting unit comprising an underdrive mechanism is disposed at the rear stage.

The effects of the above mentioned embodiment will be summarized as follow.

If the rotary sensors $A_1$ and $A_2$ are provided for both the main shifting unit 21 and sub-shifting unit 16, the friction engaging element $B_o$ of the sub-shifting unit 16 can be correctly duty controlled while sensing the shifting operation of the sub-shifting unit 16, too. Thus, the synchronous shifting operations can be ensured under all shifting states. Further, even if only the rotary sensor $A_2$ is provided for only the main shifting unit 21, the shifting of the sub-shifting unit 16 can be controlled by duty control or on-off control of the solenoid valve $S_D$. Thus, the control mechanism can have a simple constitution. Further, if the overdrive planetary unit 17 or underdrive planetary unit as the sub-shifting unit 16 is used and the front planetary gear unit 19 and rear planetary gear unit 20 as the main shifting unit 21 are used, the conventional automatic gear shifting mechanism can be used almost as is. Thus, the multistage automatic transmission 1 can be provided at low cost without requiring substantial alterations in the conventional manufacturing equipment.

Although the present invention has been described with reference to the preferred embodiment, the embodiment described herein is for illustrative purposes only and not in limitation thereof. Also, the scope of the present invention is defined in the appended claims and will not be bound by description of the embodiment. Accordingly, it will be understood that all changes and modifications which belong to the appended claims fall within the true spirit and scope of the present invention.

What is claimed is:

1. A multistage automatic shift control apparatus for a multistage automatic transmission including a gear shifting mechanism, the gear shifting mechanism having a sub-shifting unit and a main shifting unit which when up-shifted and down-shifted facilitate a multistage shifting operation of the transmission, said apparatus comprising:

friction engaging elements operatively connected to the units for varying a torque transmitting path through the units, said friction engaging elements comprising a first and a second friction engaging element, said first friction engaging element being operatively connected to one of the units for causing said one of the units to up-shift when engaged as a result of oil fed thereto, said second friction engaging element being operatively connected to the other of said units for causing said other of the units to down-shift when disengaged as a result of oil being drained therefrom;

a rotational speed detecting means associated with at least said one of the units to which said first friction engaging element is operatively connected for sensing the rotational speed of a predetermined rotatable element comprising at least said one of the units and for issuing a signal corresponding to the rotational speed of the predetermined rotatable element; and a control means operatively connected to said rotational speed detecting means for receiving said signal therefrom when a change in a shifting state of the first frictional engaging element occurs at which time said first frictional engaging element engages, and for regulating the drainage of the oil from the said second frictional engaging element in response to said signal to cause said second frictional engaging element to disengage concurrently with the engagement of said first frictional engaging element for synchronizing the up-shifting and the down-shifting operations of the respective units caused by the concurrent engagement and disengagement of said first and said second frictional engaging elements.

2. A multistage automatic shift control apparatus as claimed in claim 1,
wherein said rotational speed detecting means associated with at least said one of the units is also associated with said other of said units to which said second frictional engaging element is operatively connected for sensing the rotational speed of a predetermined rotatable element comprising said other unit and for issuing a signal corresponding to the rotational speed of the predetermined rotatable element of said other unit.

3. A multistage automatic shift control apparatus as claimed in claim 1,
wherein said rotational speed detecting means associated with at least said one of the units is associated with only said one of the units.

4. A multistage automatic shift control apparatus as claimed in claim 1 wherein said sub-shifting unit includes one of an overdrive planetary gear unit and an underdrive planetary gear unit, and said main shifting unit includes a front planetary gear unit and a rear planetary gear unit.

5. A multistage shift control apparatus as claimed in claim 4,
wherein said control means includes a solenoid valve for regulating a brake disengaging pressure of a brake operatively connected to said one of said overdrive planetary gear unit and said underdrive planetary gear unit in response to receiving said signal.

6. A multistage shift control apparatus as claimed in claim 5,
wherein said rotating speed detecting means comprises a first rotary sensor for detecting the rotational speed of a sun gear of said one of an overdrive planetary gear unit and an underdrive planetary gear unit, and a second rotary sensor for detecting the rotational speed of a sun gear of the front and the rear planetary gear units, and said solenoid valve is duty controlled according to signals from said first and said second sensors.

7. A multistage shift control apparatus as claimed in claim 5,
wherein said rotating speed detecting means comprises a rotary sensor for detecting the rotational speed of a sun gear of said front and said rear planetary gear units, and said solenoid valve is controlled according to signals from said rotary sensor.

* * * * *